March 24, 1959 G. K. VAN STEYN 2,878,619
MACHINE FOR PERFORMING WORK ON GLASS AMPULS
Original Filed Sept. 9, 1952 9 Sheets-Sheet 1
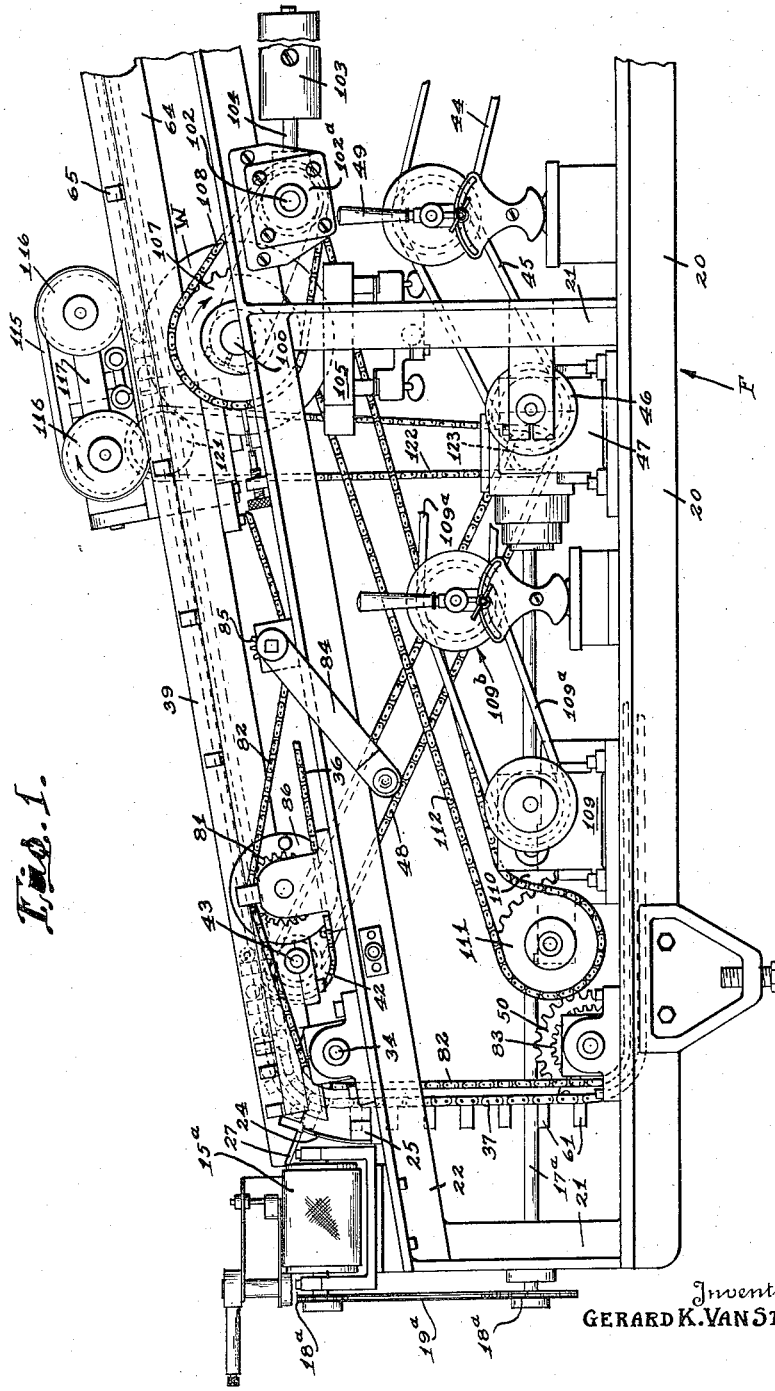
Inventor
GERARD K. VAN STEYN
By Rule & Hoge
Attorneys

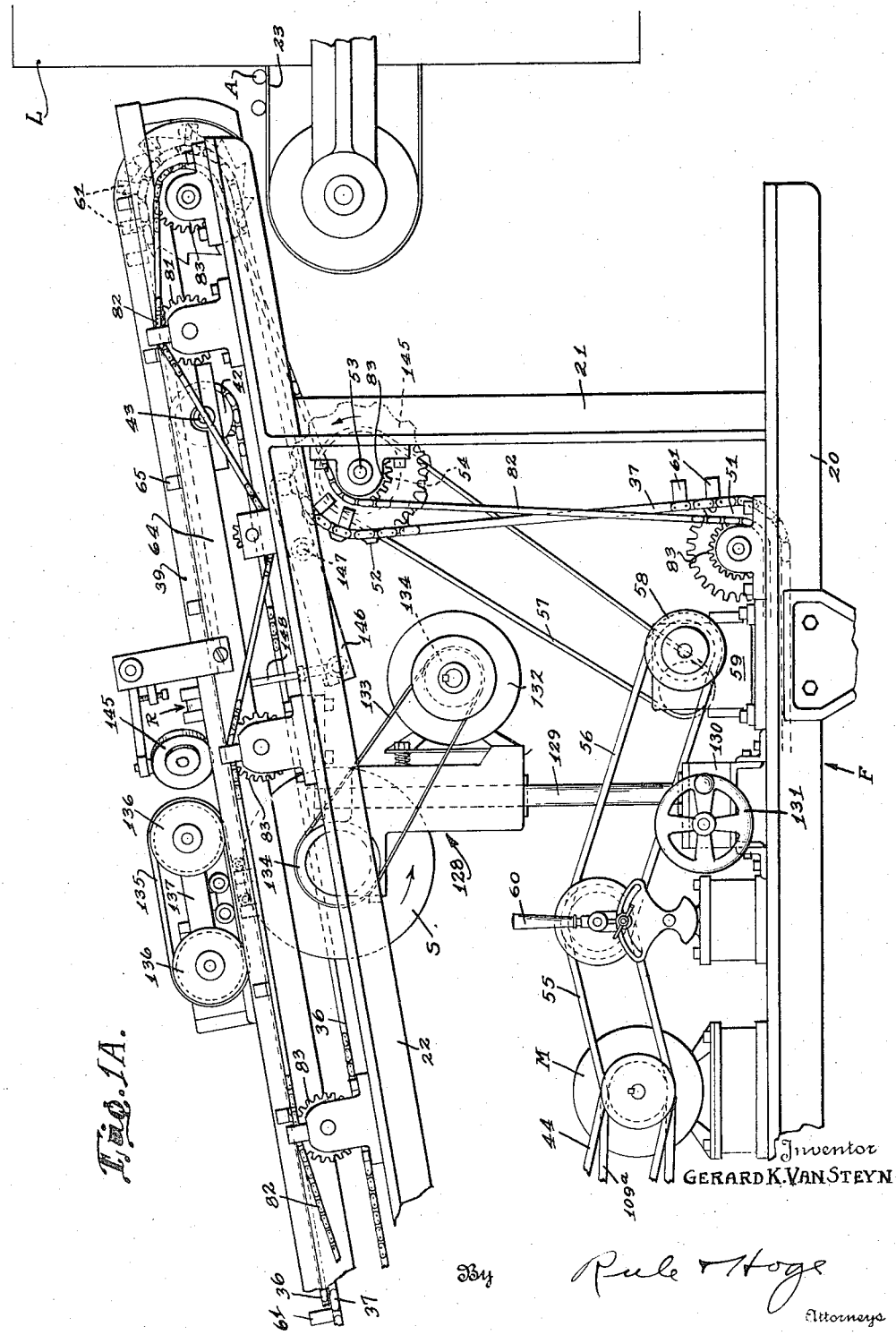

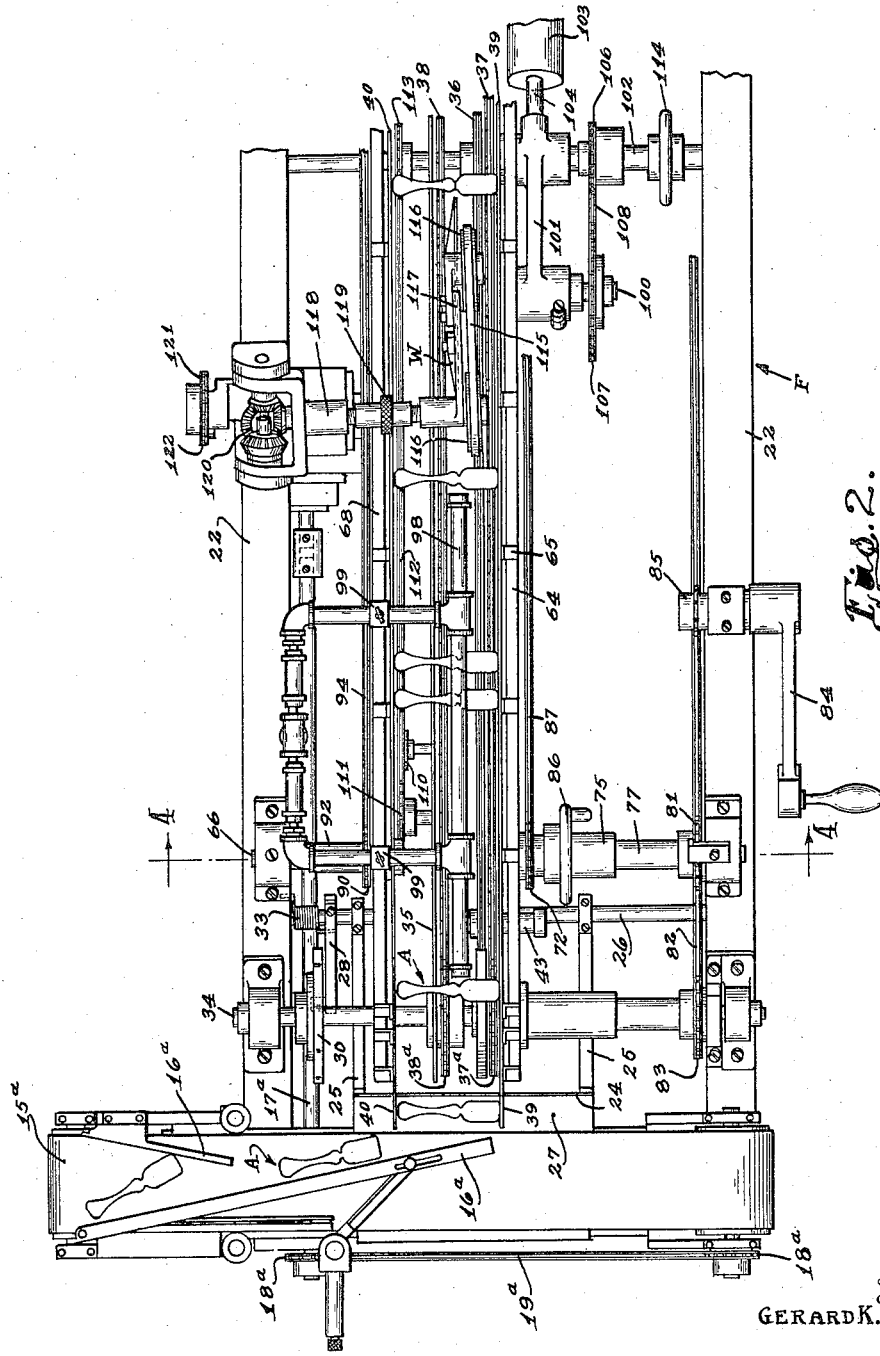

March 24, 1959 G. K. VAN STEYN 2,878,619
MACHINE FOR PERFORMING WORK ON GLASS AMPULS
Original Filed Sept. 9, 1952 9 Sheets-Sheet 4

Inventor
GERARD K. VAN STEYN
By Rule & Hoge
Attorneys

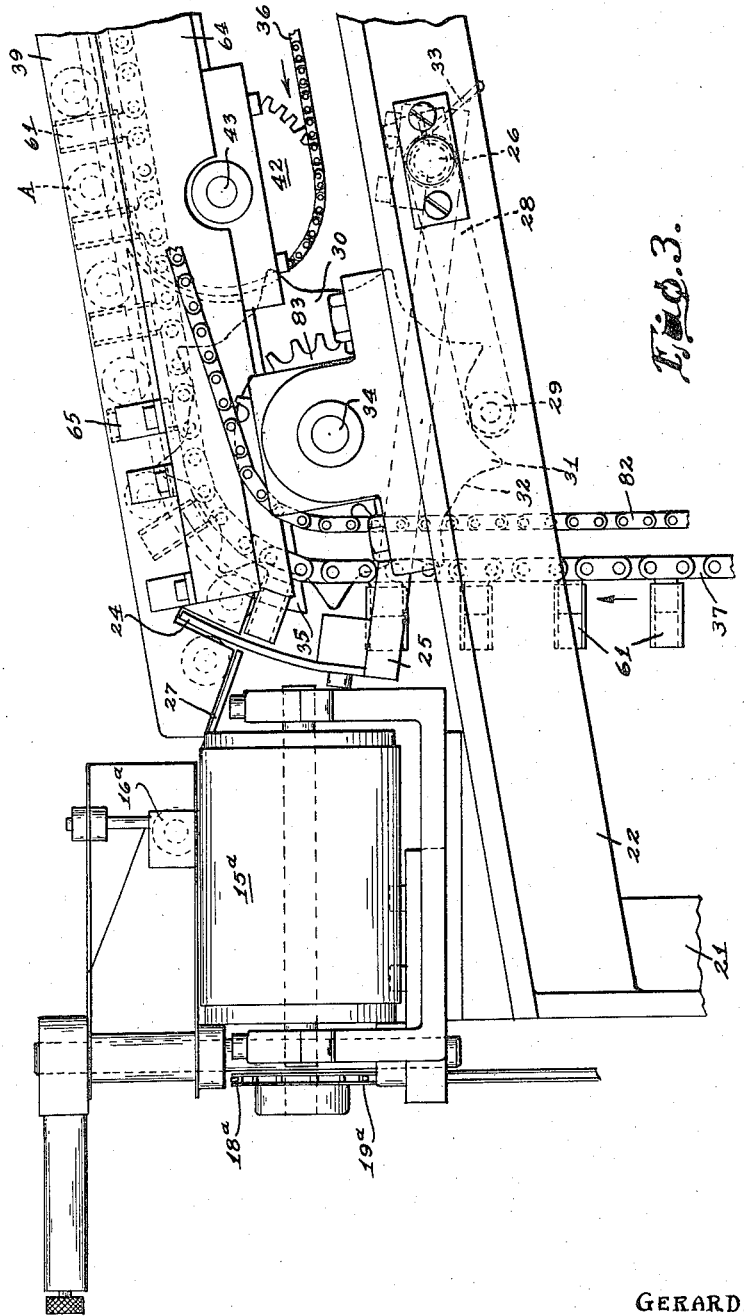

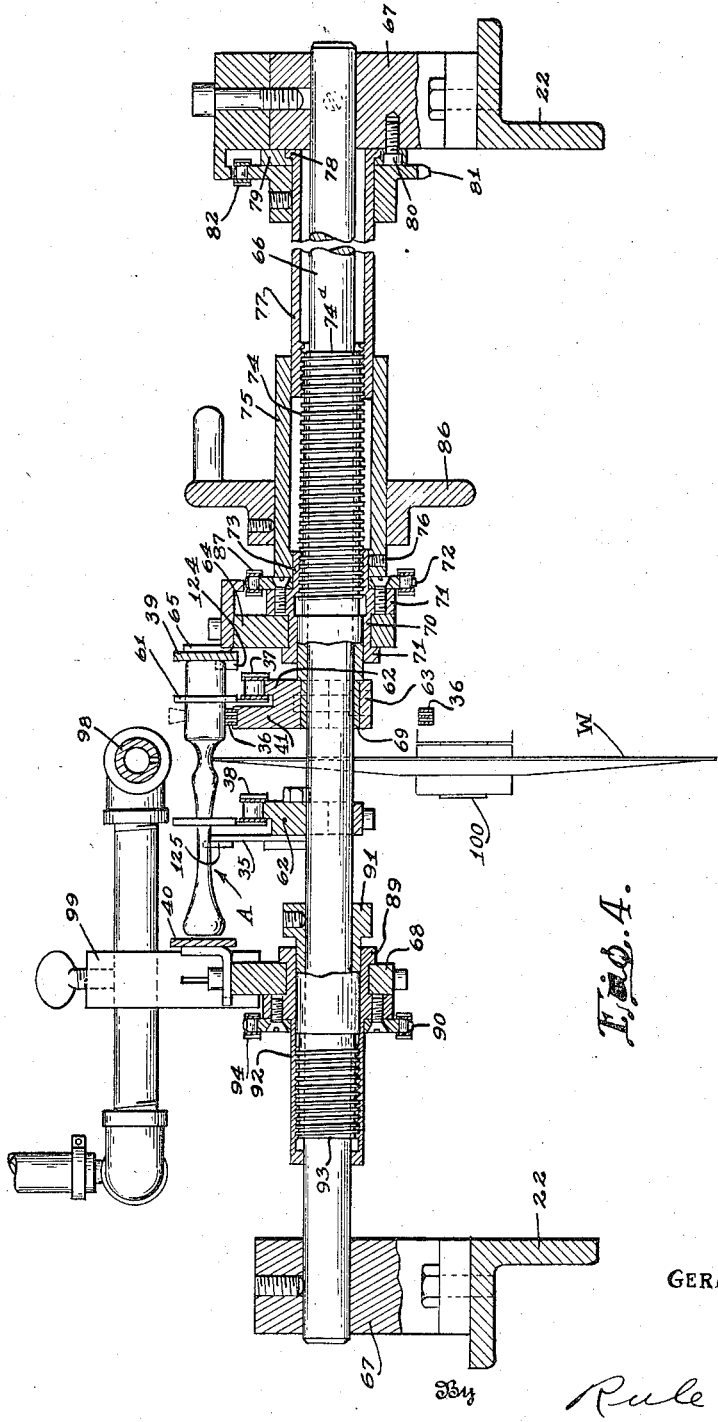

Inventor
GERARD K. VAN STEYN
By Rule & Hoge
Attorneys

Inventor
GERARD K. VAN STEYN
By Rule & Hoge
Attorneys

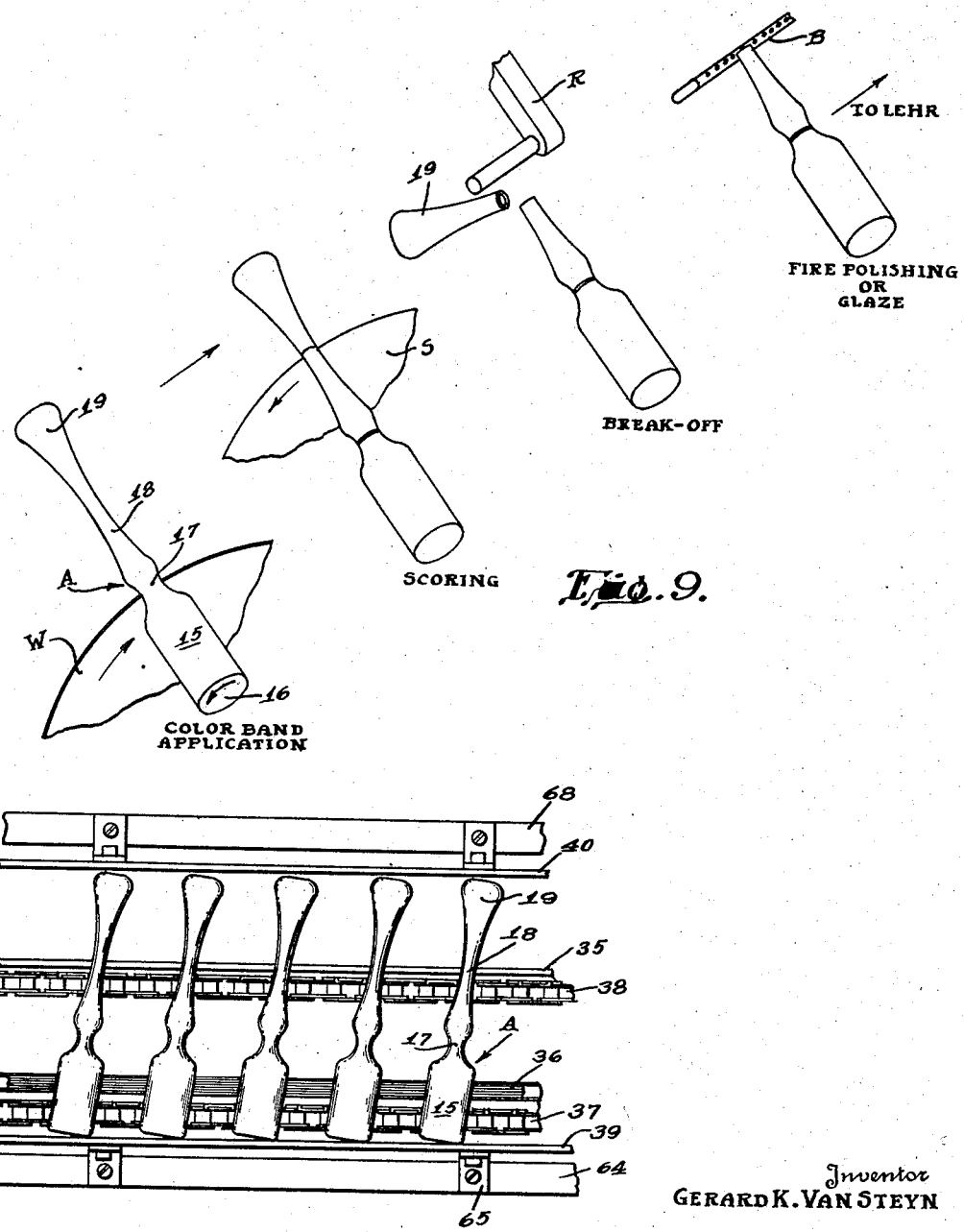

United States Patent Office 2,878,619
Patented Mar. 24, 1959

2,878,619

MACHINE FOR PERFORMING WORK ON GLASS AMPULS

Gerard K. Van Steyn, Columbus, Ohio, assignor to Owens-Illinois Glass Company, a corporation of Ohio Original application September 9, 1952, Serial No. 308,637. Divided and this application February 28, 1956, Serial No. 568,396

3 Claims. (Cl. 49—1)

The present invention relates to a machine for automatically scoring a selected area of glass ampuls of the character described in Smith Patent No. 2,517,604 issued August 8, 1950, and is a division of my copending application, Serial No. 308,637, filed September 9, 1952, now abandoned entitled "Method and Machine for Performing Work on Glass Ampuls."

An object is the provision of novel automatic means whereby ampuls, with, or without bands applied to the neck portion or elsewhere, and immediately upon their discharge from the forming machine, may be scored preparatory to and to facilitate removal of the "bell end" and then glazed following breaking off of the bell end, prior to entry into an annealing lehr.

It is also an object of my invention to provide novel means for scoring the ampul circumferentially at the intended line of separation of the "bell end" from the ampul proper, such that the depth of the score is increased gradually from zero to the maximum desired, without interrupting continuous movement of the ampul, through the machine.

It is likewise an object of my invention to provide novel means for adjusting the machine to accommodate ampuls of different length and diameter and to regulably position the ampuls with relation to the banding, scoring and break-off devices.

Further, it is an object of my invention to provide novel means for controlling ingress of ampuls into the machine so that they will be spaced apart properly for subsequent treatment.

A still further object is the provision of novel means whereby the ampuls, by reason of rotation about their own axes, coupled with utilization of the force of gravity, are automatically accurately positioned for treatment as they move through the machine.

Other objects will be in part apparent and in part pointed out hereinafter.

In the drawings:

Figure 1 is a side elevational view of approximately the lower half, or left-hand section of the machine.

Figure 1-A is a similar view of the other or right-hand portion, Figures 1 and 1-A together showing the entire machine in side elevation.

Figure 2 is a top plan view of the section shown in Figure 1.

Figure 2-A is a top plan view of the section shown in Figure 1-A.

Figure 3 is an enlarged fragmentary side elevational view of the inlet end of the machine.

Figure 4 is a transverse sectional view taken substantially along the line 4—4 of Figure 2.

Figure 8:
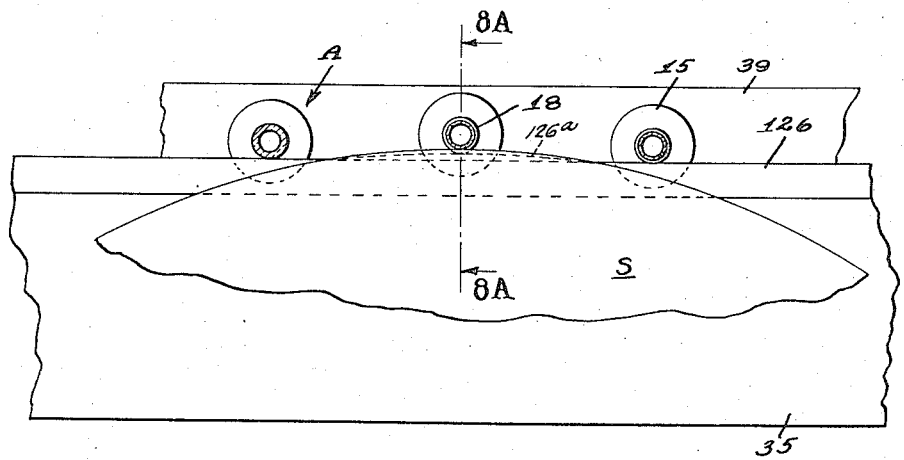

Figure 8-A is a sectional view at line 8A—8A of Figure 8.

Figure 9 is a view illustrating schematically the successive operations performed upon the articles.

Figure 10 is a fragmentary plan view showing the angular positioning of the ampuls which results in their being held against the base rail.

In Figure 9 I have illustrated more or less graphically what my invention aims to accomplish and the procedure involved.

Each ampul A, as it leaves the forming machine (not shown), and while still retaining a substantial amount of the residual heat from the forming operation, is delivered to the machine of the present invention. The ampul at this stage includes a body part 15, having a closed base end 16, a neck, or constriction 17, a tapered tip end 18, and a so-called bell end 19, or moile.

As an initial step, the neck, or constriction 17, is cooled to a temperature such that when a band of paint, ceramic material or the like, is applied thereto, such will remain in place and not tend to run off, or thin out in spots.

As illustrated in Figure 9, the ampul then passes over and in contact with the periphery of a banding wheel W, or disk, which applies the paint, as a circumferential band, to the neck or constriction. Then the ampul moves to a rotating scoring saw S, which forms an annular score line between the tapered part and bell end, and following this scoring step, the ampul moves on to a break-off station where a rocker arm R snaps off the bell end. The next step is to move the ampul to a glazing position where a burner B fire polishes the broken end. Following this operation, the ampul enters an annealing lehr L in which conventional annealing of the ampul and firing of the applied band are effected.

The ampuls A are formed in an automatic machine of conventional type (not shown) and deposited upon a delivery conveyor 15$^a$ (Figs. 1, 2, and 3) provided with deflectors 16$^a$ which direct these ampuls, base end first to the inlet end of my banding and break-off machine. This conveyor 15$^a$ is driven in synchronism with the other parts, by means of a shaft 17$^a$, a pair of sprockets 18$^a$, and a sprocket chain 19$^a$, from the main motor M (Figs. 1 and 1A), which is the source of power for many of the various mechanisms and units constituting my machine.

This machine (Figs. 1 to 3) comprises a frame F including a horizontal base 20, vertical posts 21 and a pair of inclined bars 22 mounted upon said posts. These inclined bars 22, which support the ampul conveying means, as well as devices for performing the work on said ampuls, as will be apparent presently, have their lower ends positioned beneath the delivery conveyor 15$^a$, the upper ends being extended to overlie the receiving end of the lehr conveyor 23.

Ampuls A, including the bell end, or moile, are conveyed to the receiving end (the lower end) of my machine and delivered one at a time to conveying means which is carried by said inclined bars 22. Controlled delivery of the ampuls is obtained by means of a gate 24 (Figs. 1, 2, and 3) extending transversely of the length of the conveying means. This gate (Figs. 2 and 3) is carried by a pair of forwardly extending arms 25 which are mounted upon a rock-shaft 26, the latter being journaled in the inclined bars 22 of the main frame. This shaft is rocked at regular time intervals to permit gravity delivery of ampuls from the inclined support 27 to the conveying means, by a rock arm 28 which carries a roller 29, or cam follower, arranged for operative engagement with the periphery of a cam 30. The cam face is formed with regularly spaced projections 31 and intermediate recesses 32 with which said roller 29 maintains contact under pressure of a coil spring 33 (Fig. 2) which is carried by the rock shaft 26. Rotation of the cam, as is apparent, rocks the shaft 26 and moves the gate 24 to and from a position in which it allows delivery of ampuls seriatim to the conveying means. The cam 30 is mounted upon a shaft 34 which also carries part of the conveying means, about to be described and, as will be apparent presently, is driven by movement of said conveying means.

The conveying means which carries the ampuls in a recumbent position through the machine to the lehr (Figs. 1, 2, 3, and 6) comprises an elongated rail 35, an endless chain 36 (Morse chain) which is driven to rapidly rotate the ampuls clockwise about their own axis as viewed in Fig. 1, a pair of driven parallel finger chains 37 and 38 extending the full length of the machine and base and bell end rails 39 and 40 respectively.

The ampul rotating chain 36 (Morse chain) has its upper reach (Figs. 4 and 5) supported on an elongated guide 41 and is trained over a pair of sprockets 42 (Figs. 1 and 1A) carried by transverse shafts 43. The shaft 43 at the lower end of the machine (Figs. 1 and 1A) is driven by the motor M operating through a series of belts 44 and 45, a "Reeves" drive 46, a gear reduction unit 47 and a sprocket chain 48. A lever 49 is manually operable to regularly control the linear speed of the belts 45 and 48, the pulleys shown being of the conventional "Reeves" type.

The finger chains 37 and 38 are trained over pairs of sprockets 37ª and 38ª at the inlet and discharge ends of the machine and over idler sprockets 50 and 51 in the lower part of the main supporting frame. Near the discharge end (Fig. 1A) these finger chains are trained over driven sprockets 52 which are carried by a transverse shaft 53, the latter carrying a pulley 54. This pulley receives its power from the motor M operating through belts 55, 56, and 57, a "Reeves" drive 58, and gear box 59. Here again a lever 60 is manually operable to regulably control the linear speed of the belts 55 and 56 in a conventional manner.

Figure 5:
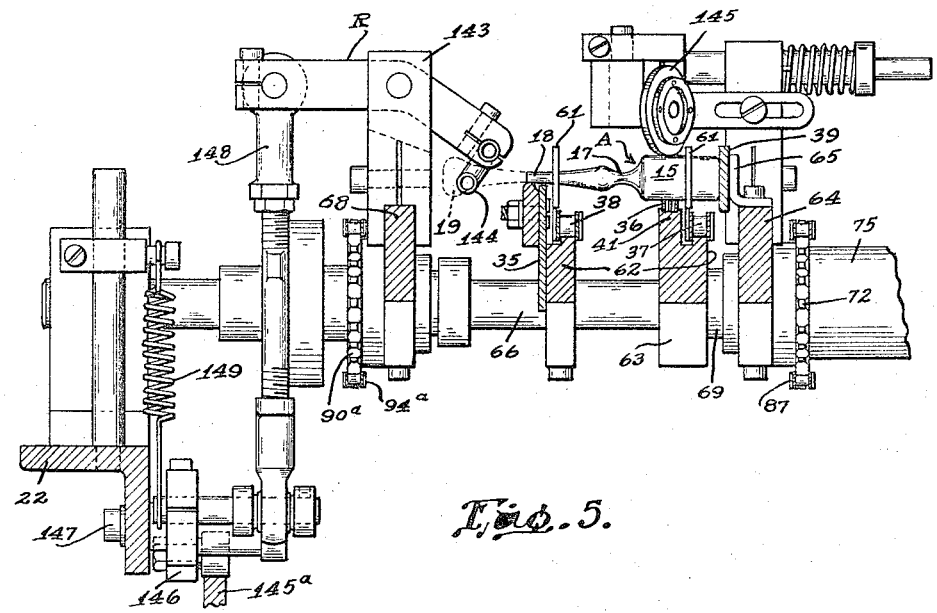
Figure 5 is a sectional view taken substantially along the line 5—5 of Figure 2-A.
Figure 6:
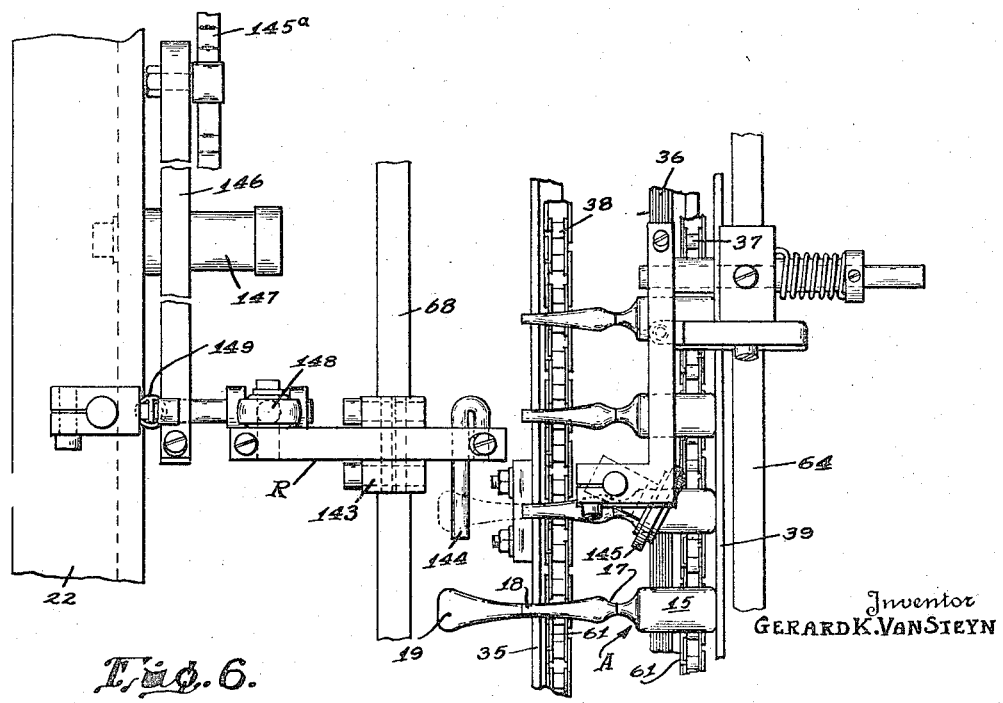
Figure 6 is a plan view of the elements illustrated in Figure 5.

Each of the finger chains 37 and 38 is a sprocket chain carrying fingers 61 spaced apart as in Figure 6 to support and move the ampuls along the rail 35 and "Morse" chain 36, with their axes at right angles to the direction of travel of the ampuls, or as in Figure 10, with such axes slightly inclined so that incident to their advancing movement and rotation they tend to move laterally and maintain contact with the base rail 39. The upper reach of each of these finger chains is supported upon stationary guides 62 (Figs. 4 and 5).

Referring to Figures 4 and 5, the base rail 39, together with the support 63 for the guide 41 and one of the guides 62 and the "Morse" chain 36 and finger chain 37 may be adjusted laterally relative to the finger chain 38 and bell end rail 40, to accommodate ampuls of different length. As will be observed, the base rail 39 (Figs. 2, 4, and 5) is attached to a carrier bar 64 by means of a series of brackets 65. Such adjustment as stated is relative to the second finger chain 38 and the rail 40 which is at the bell end of the ampuls.

Figure 2A:
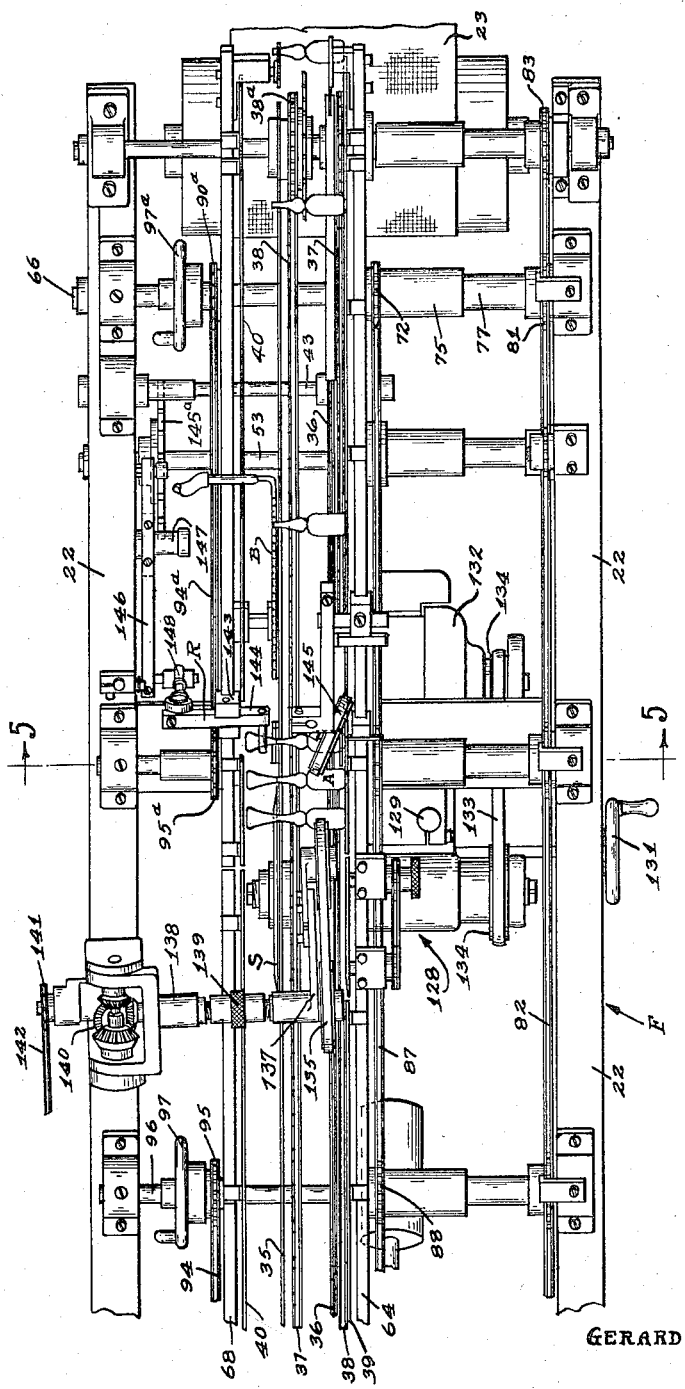

The mechanism involved for effecting such adjustment is as follows: a stationary rod 66 (Fig. 4) has its ends fixedly mounted in blocks 67 on the inclined bars, there being one such shaft at each end of the machine, as indicated in Figures 2 and 2A, so that all portions of the elements to be adjusted will be moved in the same direction and to like degrees, as will be apparent presently. Each of these rods 66 extends through transverse openings in the carrier bar 64 for the base rail 39, the support 63 for the guide 41 and one of the guides 62, and carrier bar 68 for the aforementioned rail 40 at the bell end of the ampuls.

A shouldered sleeve 69 (Figs. 4 and 5) is telescoped over the rod 66, having a tight frictional engagement with the rod and wall of the opening through said support 63. The extended end of sleeve 69 is telescoped between the rod 66 and a collar 70, the latter having radial flanges 71 in engagement with the opposed vertical faces of the carrier bar 64. One of these flanges 71 is of greater diameter than the other and carries a sprocket 72. A reduced extension 73 on the collar 70 is internally screw threaded for engagement with mating threads 74 carried by a cylinder 74ª slidable on said rod 66.

A tube 75 has one end telescoped over the extension 73 and is secured thereto, as by means of a screw 76. The other end of said tube 75 telescopes over the inner end of a sleeve 77 which is internally threaded for engagement with the aforementioned screw threads 74 on said cylinder 74ª. The outer end of this sleeve 77 is formed with a flange 78 which is held in contact with the inner side of the block 67 by means of a collar 79, the latter being secured to said block by means of a screw 80, or the like fastener.

Adjustment of the base rail 39 and the "Morse" chain 36, together with the finger chain 37, relative to the other finger chain 38 and bell end rail 40, is obtained by rotation of a sprocket 81 which is secured to the aforementioned sleeve 77. A sprocket chain 82 (Figs. 1 to 4) is trained over the sprocket 81 (there being another corresponding sprocket at the upper end of the machine) and over sprockets 83 which are mounted upon the main frame F. A hand operated crank 84 carries a sprocket 85 meshing with the chain 81. Rotation of this crank imparts motion to the chain 81 and thereby adjusts the base rail 39, "Morse" chain 36 and adjacent finger chain 37. By reason of the presence of the structure of Figure 4, at both ends of the machine and interconnection of same through the sprocket chain 81, uniform and corresponding adjustment of all portions of these elements is obtainable.

Rotation of the sprockets 81 correspondingly moves the sleeves 77, which, due to the screw connection with the cylinders 74ª, moves the latter axially and adjusts the base rail, "Morse" chain 36 and finger chain 37 laterally.

Should it be desired, or necessary, to adjust only the position of the base rail 39, such is obtained by manual rotation of the hand wheel 86 (Figs. 1, 2, and 4) which is secured to the tube 75. Such operation of the hand wheel rotates the tube 75, collar 70 and sprocket 72 carried by the latter and axially moves said collar and the base rail carrier bar 64, relative to the "Morse" chain and finger chain 37. To the end that the entire rail from end to end may be uniformly adjusted, a sprocket chain 87 (omitted from Figs. 1 and 1A to avoid confusion, but shown in Figs. 2, 2A, 4 and 5) is trained over the sprockets 72, and an idler sprocket 88.

Referring again to Figures 4, 5, and 6, the second finger chain 38 and supporting rail 35 for the ampuls, occupy a fixed position with relation to the aforementioned base rail 39 and finger chain 37. The so-called bell end rail 40, however, may be adjusted laterally, such being obtained by the following described mechanism. A flanged collar 89 is rotatively connected to the carrier bar 68, there being a sprocket 90 secured to said collar. A bearing sleeve 91 is positioned between the shaft 66 and collar 89 and is secured to said shaft. A tubular extension 92 outwardly of the collar 89, telescopes over and is threaded upon a cylinder 93 which is non-rotatively mounted upon the shaft 66. Rotation of the sprocket 90 moves the collar 89 and extension along the shaft and thereby adjusts the position of the rail 40, as stated heretofore. A sprocket chain 94 (Figs. 2A and 4) is trained over the sprocket 90 and extends forwardly to a point at which it meshes with an idler sprocket 95. This second sprocket is mounted upon a cross-shaft 96 which carries a hand wheel 97, rotation of which imparts motion to the chain 94 and effects lateral adjustment of the bell end rail 40. Preferably this bell end rail 40 and the base rail 39 are spaced apart a distance slightly greater than the length of the ampuls being handled, these rails together functioning to locate the ampuls on the supporting rail 35 and "Morse" chain 36.

The bell end rail 40 is made up of two longitudinally aligned sections, the supporting and adjusting mechanisms being identical. The second section, as shown in Figure 2A is operated by a hand wheel 97ª which rotates a sprocket 90ª over which a sprocket chain 94ª is trained. An idler sprocket 95ª near the lower end of this second rail section is meshed with said chain 90ª.

The ampuls, which still contain a substantial amount of the residual heat from the forming operation, at the time they enter the machine, are first subjected to accelerated artificial cooling in the neck, or constriction, to prepare same for the banding. Such cooling is obtained by blowing streams of air downwardly from a cooling air pipe 98, which, as shown in Figures 2 and 4, is mounted for lateral adjustment in brackets 99, so that the air may be directed against the neck portions of the ampuls, irrespective of the location of same. From the cooling zone, the ampuls proceed to a banding position, or station, at which a band of paint, or ceramic material, containing a coloring pigment, is applied circumferentially of the previously cooled neck portion. In the interim the ampuls have been rotated rapidly about their axes to effect further cooling and contribute to the effectiveness of the applied cooling air.

The banding unit (Figs. 1, 2, 4, and 9) is composed of a wheel W, or disk, mounted upon a transverse stub-shaft 100, which is supported at the free forward end of an arm 101 rockably mounted upon a cross-shaft 102, the ends of which are journaled in bearings 102ª on the inclined frame bars 22.

A counter weight 103 is adjustably mounted upon a rod 104 to balance the paint applying wheel W and regulably control its pressure against ampuls to which paint is being transferred from a reservoir 105. This wheel W (Figs. 1 and 2) is positively driven by means including a sprocket 106 on said cross-shaft 102, a sprocket 107 on the shaft 100 which carries the paint wheel W and a sprocket chain 108 trained over said sprockets. The cross-shaft in turn receives its power from the motor M through a gear box 109, sprockets 110 and 111 and a sprocket chain 112, the latter being also trained over a sprocket 113 which is mounted upon one end of the aforementioned cross-shaft 102. Belts 109ª and a speed changer 109ᵇ operatively connect the motor M and said gear box 109.

Incident to adjustment of the base rail and associated parts, to accommodate ampuls of different length, it frequently may be necessary to correspondingly change the position of the paint wheel W, so that it will accurately transfer the paint to the neck portions. To this end a hand wheel 114 (Fig. 2) is mounted upon the shaft 102 and actuates mechanism substantially of the type utilized to adjust the base rail 39 and as indicated in Figure 4.

As the ampuls enter and pass through the banding zone, they are held in firm, but yielding contact, with the paint wheel W by means of an endless belt 115, which is mounted upon pulleys 116 carried by a frame 117. This frame is mounted upon a bracket 118 carried by one of the inclined bars 22 and includes an adjusting device 119 for altering the lateral position of the pressure belt as determined by the setting of the paint wheel W. One of the pulleys is operatively connected to and driven by gears 120 which in turn receives its power from the motor M through a sprocket 121 and chain 122, the latter being trained over a sprocket 123 which is connected to the aforementioned gear box 47. This is more or less conventional.

In the banding zone, the ampuls are elevated from contact with the rail 35 (Fig. 4), "Morse" chain 36 and finger chain 37 so that they may be rotated by means of the pressure belt 115 and paint wheel W independently of said "Morse" chain to thereby avoid marring, or scratching, the surface. Such lifting of the ampuls is obtained by a raised rail section 124 attached to the base rail 39 and a similar rail section 125 attached to the ampul supporting rail 35.

Incident to moving away from the banding zone, or position, the ampuls leave the raised rail section 124 and 125 and are again supported upon the base rail 39 and "Morse" chain and moved forwardly by means of the finger chains 37 and 38 to a scoring zone, or position. During such forward movement of the ampul they are rotated rapidly by means of the "Morse" chain and thereby further cooled. Such also tends to dry and set the previously applied band.

Figure 7:
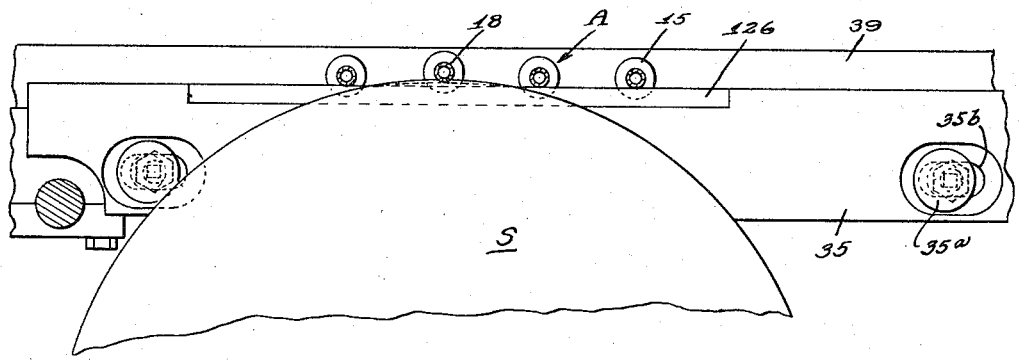
Figures 7 and 8 are detail side elevational views of the means for raising the ampuls at the banding and scoring positions.
Figure 8A:
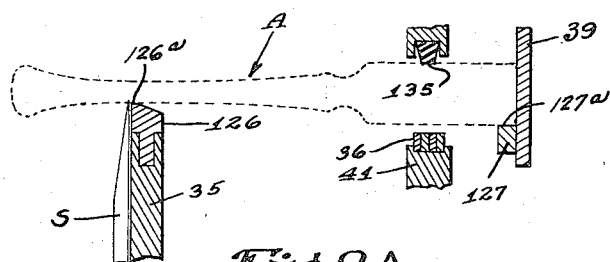

Upon entering the scoring zone, the ampuls are again elevated above the "Morse" chain, preparatory to engagement with the scoring saw S. Such elevating is obtained by means of sections 126 and 127 (Fig. 7, 8, and 8A) which are attached to the rails 35 and 39 respectively, and are formed with arcuate upper surfaces 126ª and 127ª. The curvature of the elevating surfaces 126ª and 127ª of these sections is on a radius slightly longer than that of the scoring saw S, the latter having a peripheral portion positioned slightly above said surfaces. Consequently, as the ampuls advance, the scoring is effected gradually from zero to the desired depth. Bolts 35ª and dots 35ᵇ (Fig. 7) provide means for adjusting these sections 126 and 127 longitudinally.

The saw S is vertically adjustably mounted upon a bracket 128 (Figs. 1A and 2A) which is secured to a post 129 rising from a base 130, including means whereby, upon rotation of a hand wheel 131, lateral adjustment of the bracket 128 and saw S, may be obtained. This is necessary to properly position the saw with relation to the ampuls. The saws is positively driven at the desired speed by means of a motor 132 and a drive belt 133 trained over pulleys 134.

As the ampuls move through the scoring zone, they are firmly held in engagement with the saw and elevating rail sections, by means of a driven endless belt 135 trained over pulleys 136. These pulleys are mounted upon a frame 137 which is carried by an arm 138 (Fig. 2A) including adjusting means 139 for properly positioning the belt relative to the saw and ampuls. The belt is driven by gears 140 which receive their power through a sprocket 141 and chain 142 from the main motor M by means (not shown). The scoring saw S forms a score line of predetermined depth entirely around the ampul.

Beyond the scoring zone is a break-off station (Figs. 1A, 2A, 5, 6, and 9) at which the bell end of the ampul is broken at the score line. The mechanism involved includes a rocker arm R, pivoted to a bracket 143 and carrying a finger 144 which contacts and snaps off the bell end 19 of the ampul. An adjustably mounted wheel 145 engages the base end of the ampul incident to breaking off of the bell end to hold the ampul against displacement during the break-off operation. The rocker arm R is moved in one direction to elevate the finger 144, by means of a rotary cam 145ª, which operates through a lever 146, the latter pivoted to a pin 147 and connected to the rocker arm through an extensible link or rod 148. A coil spring 149 (Figs. 5 and 6) operates at regular time intervals under control of the cam to quickly move the rocker arm in the reverse direction, so that the finger strikes the bell end of an ampul. The cam 145ª, being mounted upon the shaft 53 and having the peripheral recesses and projections properly related to the fingers on the aforementioned finger chains 37 and 38, insures actuation of the break-off device at proper intervals.

Immediately beyond this break-off station, the ampuls, free of the bell end, enter a glazing zone where a burner B, fire polishes, or glazes, the tip end from which the bell part has been removed. The ampuls are then discharged onto the lehr conveyor 23 and thereby carried through the lehr wherein they are annealed and the color band fired in place.

Modifications may be resorted to within the spirit and scope of the appended claims.

I claim:

1. In an apparatus of the character described and including means for continuously conveying ampuls with bell ends thereon along a predetermined path and in recumbent positions to a scoring station, the improvements which comprise a saw rotatable about a fixed axis at said scoring station, and arcuate cam means eccentric with respect to said saw imposed in the path of movement of the ampuls at the scoring station and operable on the recumbent ampuls as continuously conveyed to said scoring station for elevating the ampuls relative to the axis of said saw from said predetermined path and for moving said ampuls to gradually subject the bell ends thereof to the scoring action of said saw.

2. In apparatus of the character described, a rail for supporting ampuls in a recumbent position and spaced apart in the direction of the length of said rail, means for moving the ampuls along said rail and rotating them about their axes, a rotary scoring saw mounted for rotation about an axis transverse to the length of said rail and having a peripheral portion positioned slightly above the upper side of the rail, said rail having a section provided with a curved upper guiding surface formed on a longer radius than the radius of the saw, means for adjusting said section relative to the saw to regulably control the depth of a score line produced by the latter, and yielding means for holding the ampuls in engagement with said guiding surface.

3. In an ampul forming apparatus wherein ampuls having axially elongated bell ends are formed, the improvements of an endless conveyor chain means movable longitudinally in a substantially planar path to traverse a plurality of working stations, including a scoring station, a break-off station, and a glazing station, said chain means including a plurality of upstanding fingers for conveying recumbent ampuls with said chain and ampul support means paralleling the path of and substantially co-extensive with said chain, means to rotate the ampuls about their recumbent axes, and means for removing said ampuls from the influence of said chain means at said scoring station including arcuate cam means elevating said ampuls from said planar path only at said scoring station to accommodate gradual scoring of said ampuls, and auxiliary means for rotating said ampul when so elevated independently of the rotation effected by said chain means, said cam means being of height less than that of said fingers so that said fingers advance said ampuls therealong at the speed of the chain.

References Cited in the file of this patent

UNITED STATES PATENTS

| | | |
|---|---|---|
| 2,169,455 | Wagner | Aug. 15, 1939 |
| 2,203,573 | Krause | June 4, 1940 |
| 2,297,149 | Houck et al. | Sept. 29, 1942 |
| 2,313,814 | Eisler | Mar. 16, 1943 |
| 2,494,674 | Smith et al. | Jan. 17, 1950 |
| 2,595,077 | Hughes et al. | Apr. 29, 1952 |